(12) United States Patent
Aradachi et al.

(10) Patent No.: US 10,486,295 B2
(45) Date of Patent: Nov. 26, 2019

(54) POWER TOOL

(71) Applicant: Hitachi Koki Co., Ltd., Tokyo (JP)

(72) Inventors: Takao Aradachi, Hitachinaka (JP);
Tomoaki Sudo, Hitachinaka (JP);
Yukihiro Shima, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 15/034,667

(22) PCT Filed: Nov. 26, 2014

(86) PCT No.: PCT/JP2014/005926
§ 371 (c)(1),
(2) Date: May 5, 2016

(87) PCT Pub. No.: WO2015/079691
PCT Pub. Date: Jun. 4, 2015

(65) Prior Publication Data
US 2016/0297059 A1 Oct. 13, 2016

(30) Foreign Application Priority Data
Nov. 27, 2013 (JP) .................. 2013-245136

(51) Int. Cl.
*B25F 5/00* (2006.01)
*H02K 7/14* (2006.01)
(Continued)

(52) U.S. Cl.
CPC ............... *B25F 5/00* (2013.01); *H02K 7/145* (2013.01); *H02K 11/33* (2016.01); *H02P 29/40* (2016.02)

(58) Field of Classification Search
CPC . Y02T 10/7005; Y02T 10/7077; Y02T 10/70; B60W 10/08; B60W 20/00
(Continued)

(56) References Cited

U.S. PATENT DOCUMENTS 8,093,859 B2   1/2012  Aradachi et al.
2012/0274245 A1*  11/2012  Takano ............... B25F 5/00
                                           318/139
(Continued)

FOREIGN PATENT DOCUMENTS

CN   1917327 A    2/2007
CN   102802878 A  11/2012
(Continued)

OTHER PUBLICATIONS

International Report on Patentability for application PCT/JP2014/005926 (dated Jun. 9, 2016), 11 pages.
(Continued)

*Primary Examiner* — Kawing Chan
*Assistant Examiner* — Bradley R Brown
(74) *Attorney, Agent, or Firm* — Kilpatrick Townsend & Stockton LLP

(57) ABSTRACT

A power tool includes a motor, a connecting unit, and a controller. The connecting unit is configured to be connected to a secondary battery. A voltage detection unit is configured to detect a voltage of the secondary battery connected to the connecting unit. The controller is configured to acquire change of the detected voltage. The controller restricts the operation of the motor when the change of the voltage is a first value.

9 Claims, 6 Drawing Sheets

(51) Int. Cl.
  *H02K 11/33* (2016.01)
  *H02P 29/40* (2016.01)
(58) Field of Classification Search
  USPC .......................................................... 318/139
  See application file for complete search history.

(56) References Cited

U.S. PATENT DOCUMENTS

| 2012/0293096 | A1* | 11/2012 | Mizoguchi | B25F 5/00 |
| | | | | 318/139 |
| 2013/0015789 | A1* | 1/2013 | Miyazaki | B25F 5/00 |
| | | | | 318/139 |
| 2013/0033233 | A1* | 2/2013 | Noda | H01M 10/44 |
| | | | | 320/134 |
| 2013/0098646 | A1* | 4/2013 | Funabashi | B25F 5/00 |
| | | | | 173/2 |
| 2013/0285476 | A1 | 10/2013 | Nakano et al. | |
| 2014/0015451 | A1* | 1/2014 | Funabashi | A01D 69/02 |
| | | | | 318/139 |

FOREIGN PATENT DOCUMENTS

| EP | 2554334 A1 | 2/2013 |
| EP | 2623268 A1 | 8/2013 |
| JP | 2000-261975 A | 9/2000 |
| JP | 2009-178012 A | 8/2009 |
| JP | 2012-151921 A | 8/2012 |
| WO | WO2011/090220 A2 | 7/2011 |
| WO | WO2013/137480 A2 | 9/2013 |

OTHER PUBLICATIONS

International Search Report for international application PCT/JP2014/005926 (dated Mar. 27, 2015).
China Patent Office office action for patent application CN201480064762.6 (dated Dec. 4, 2017), 30 pages with translation.
Japan Patent Office Notification for Reason of Refusal for patent application JP2013-245136 (dated May 11, 2017), 11 pages.

* cited by examiner

[Fig. 1]
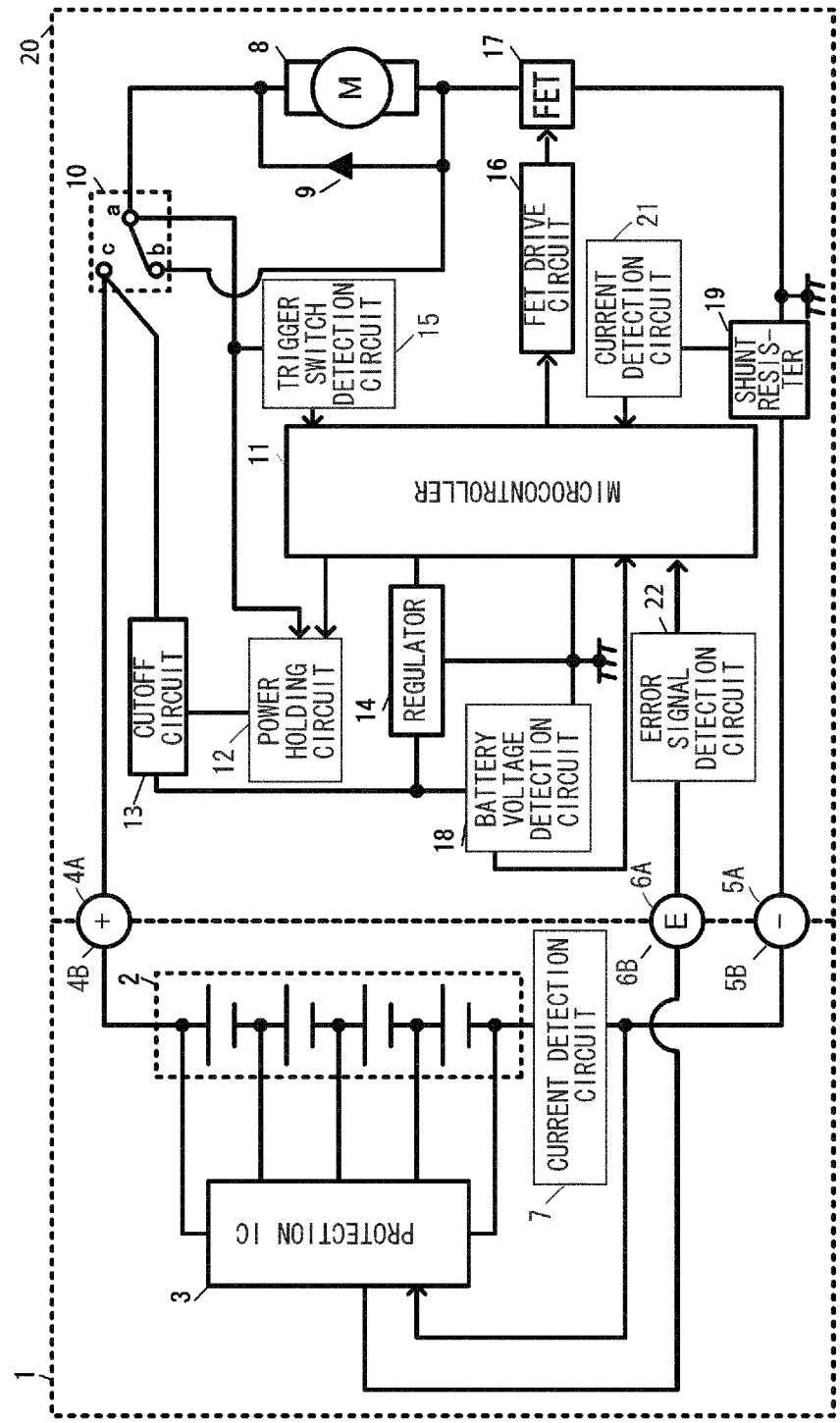

[Fig. 2]
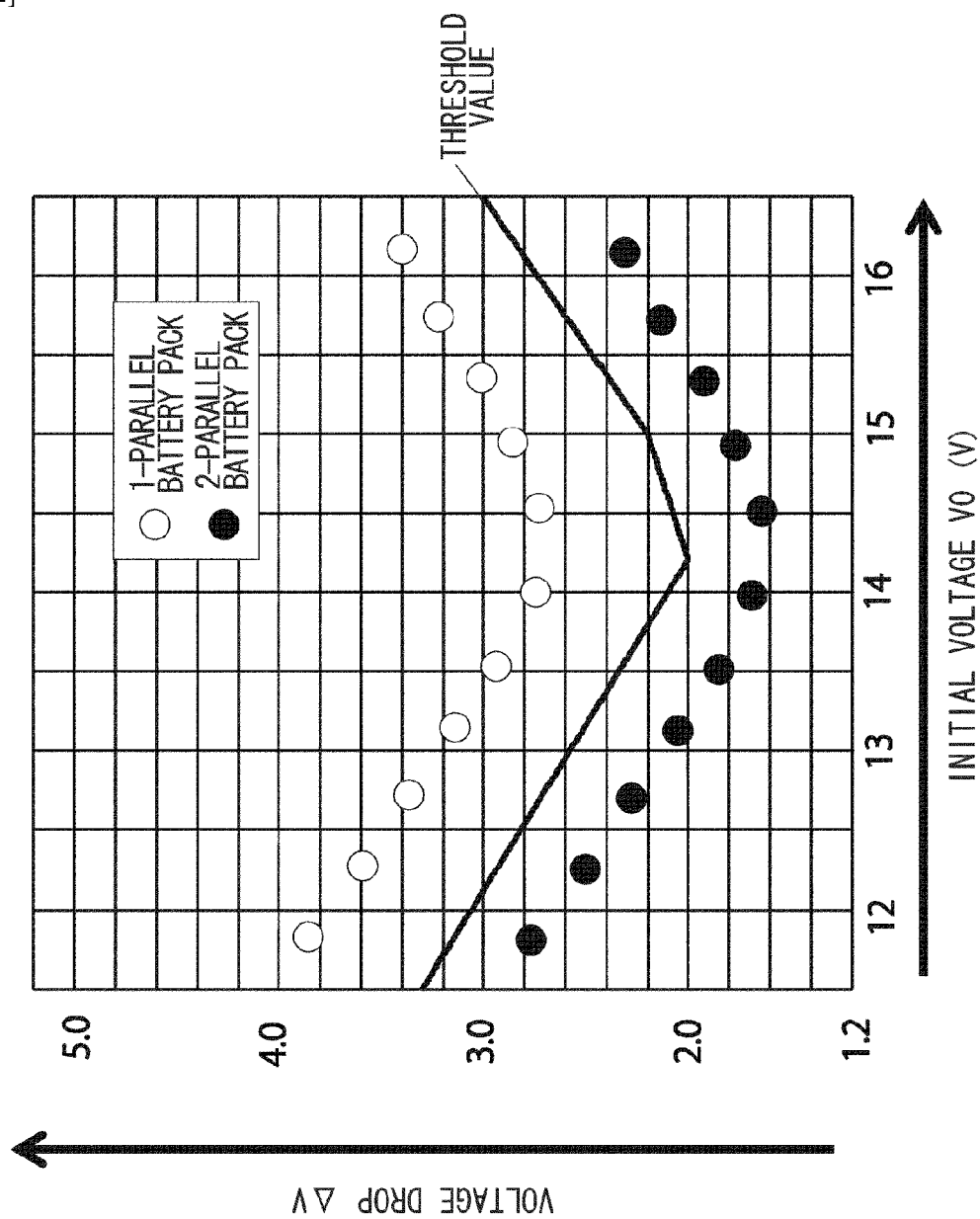

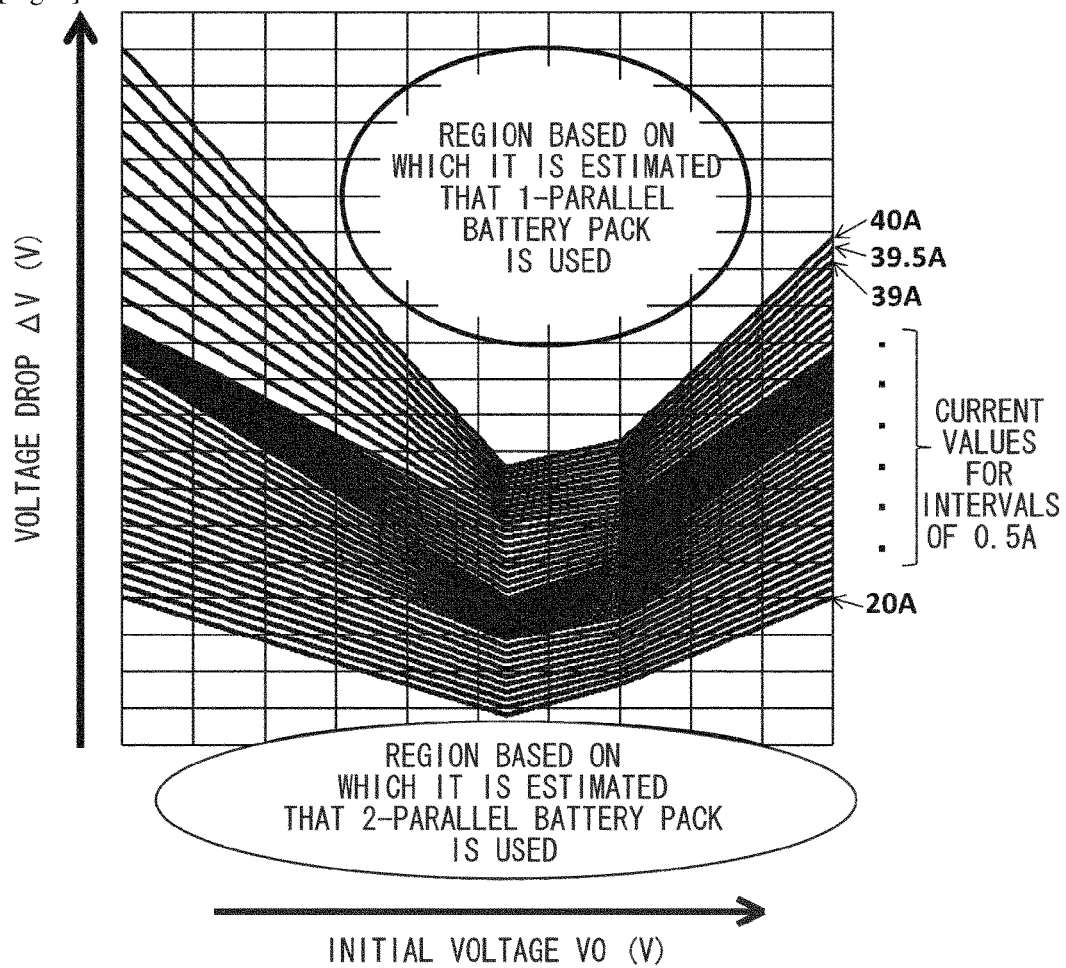
[Fig. 3]

[Fig. 4A]
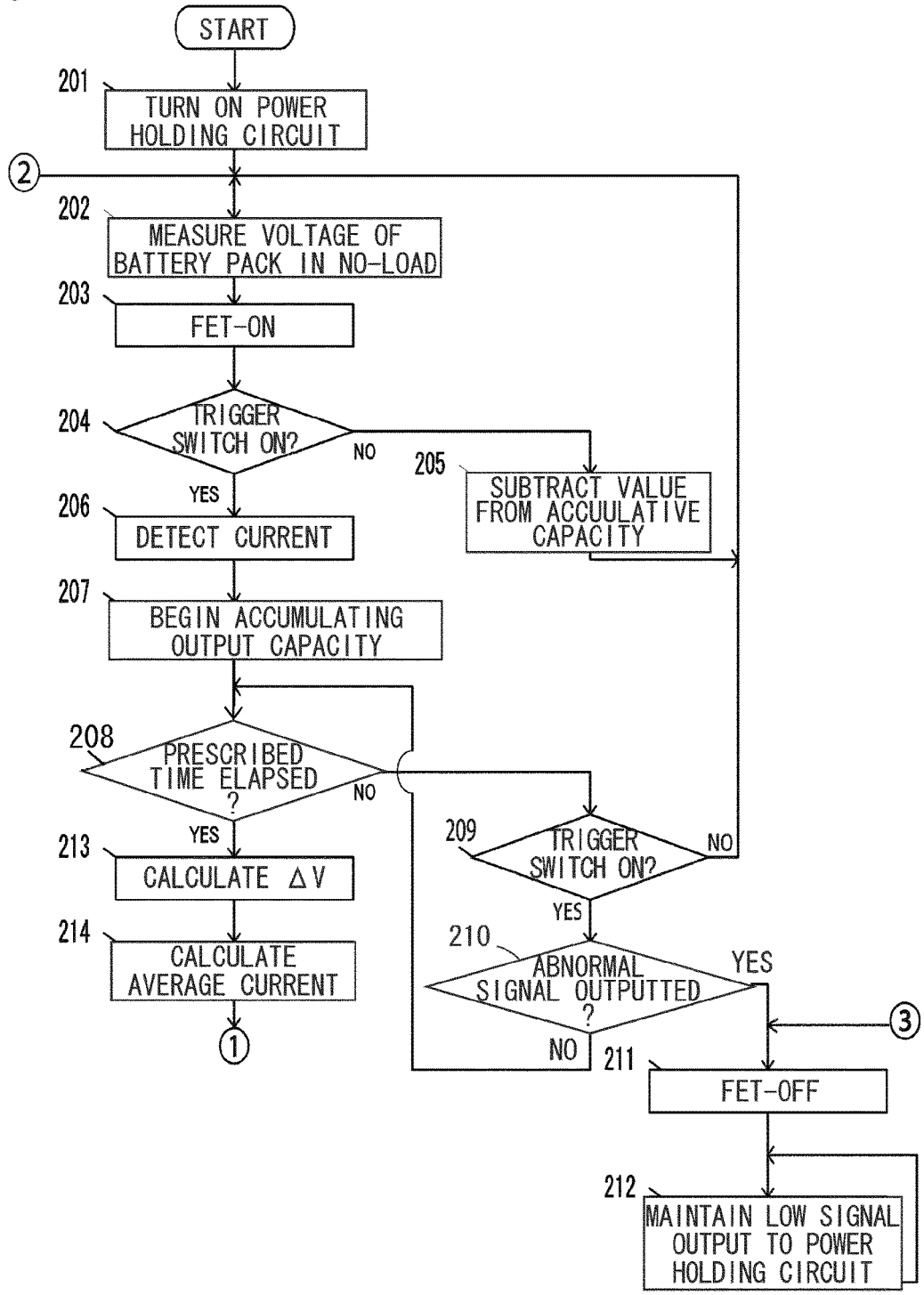

[Fig. 4B]
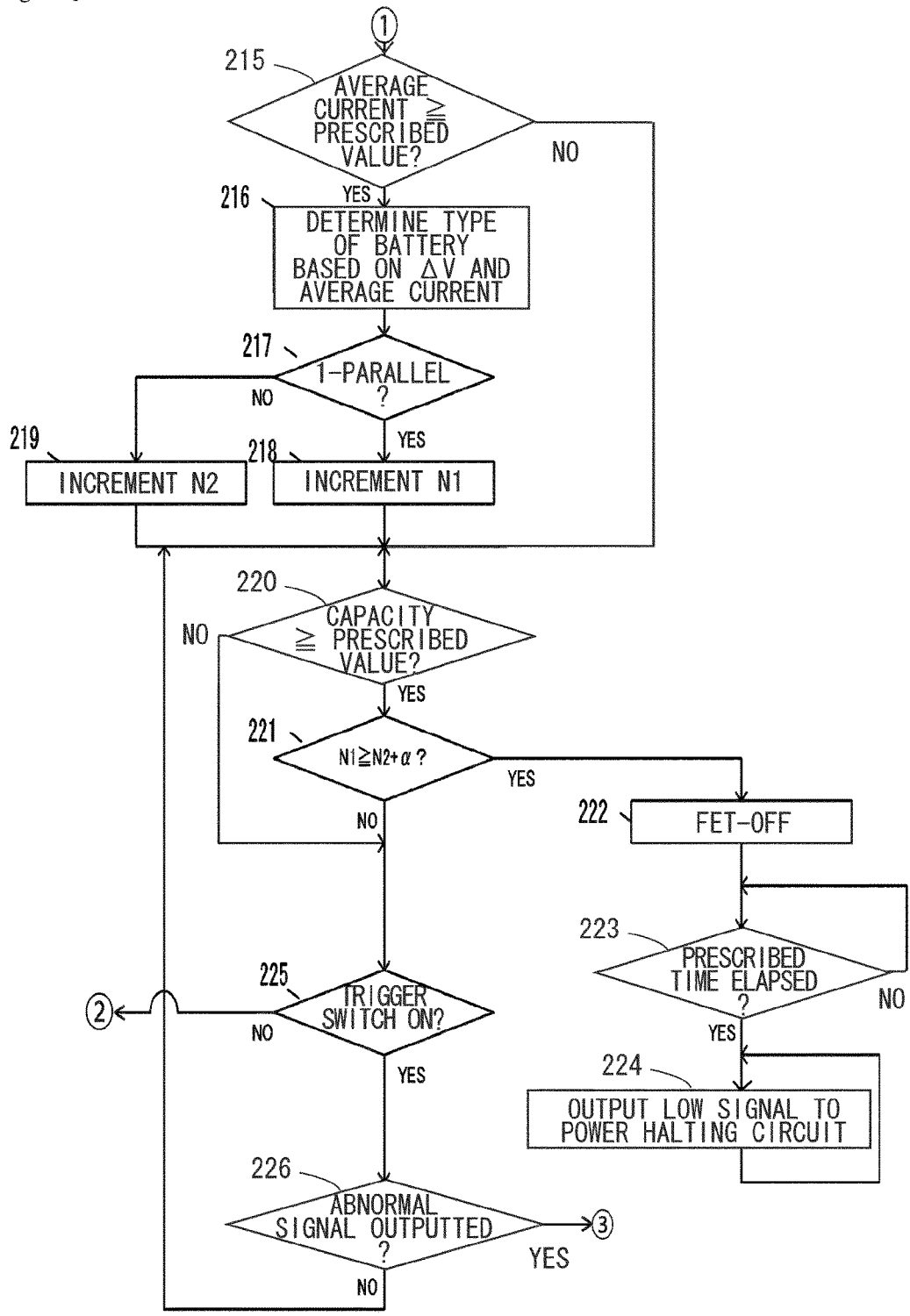

[Fig. 5]
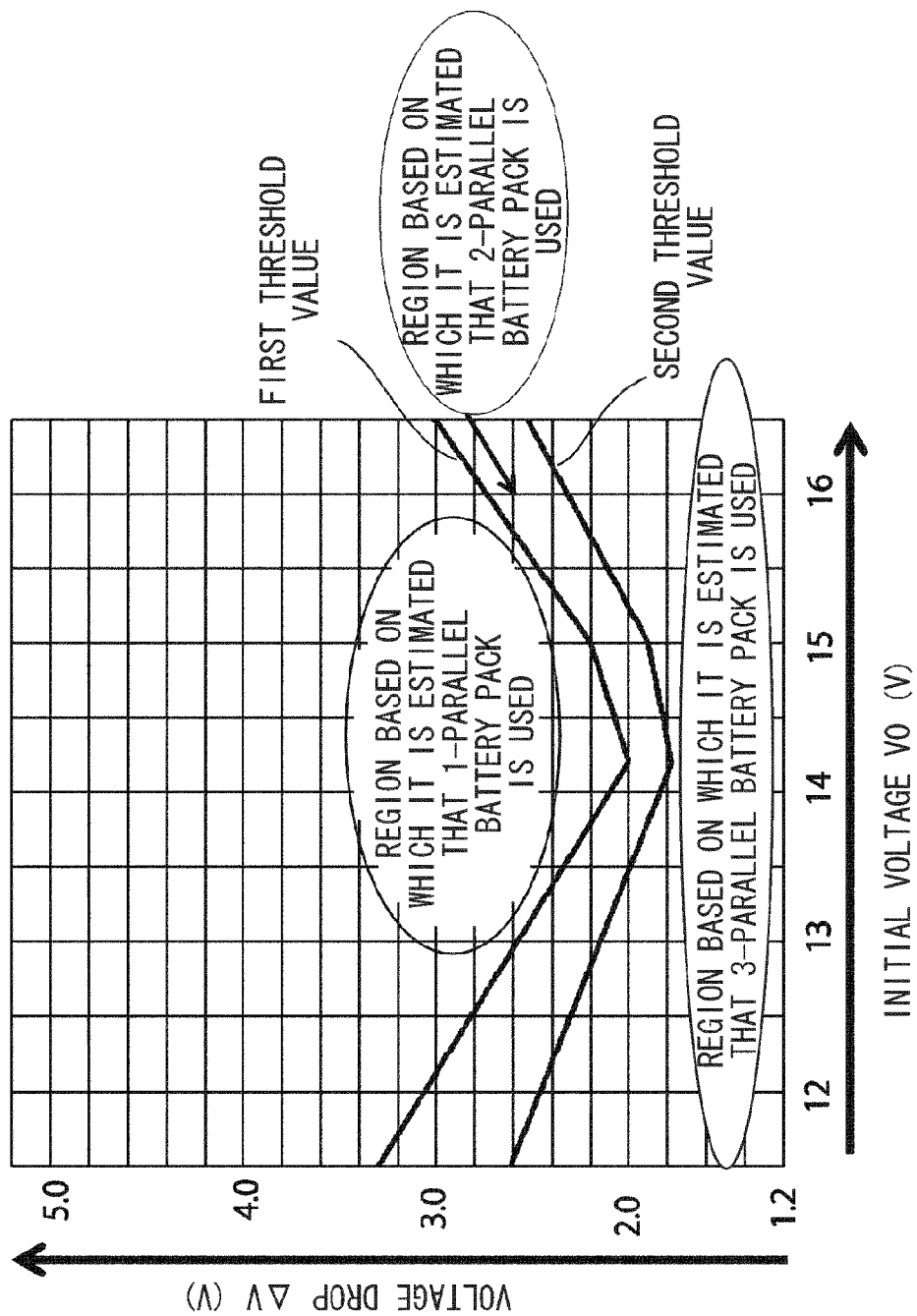

POWER TOOL

TECHNICAL FIELD

The present invention relates to a power tool driven by secondary batteries.

BACKGROUND ART

Patent Literature discloses a rechargeable battery packs that are made for use with power tools and has an identification resistor indicating its battery type, and a connection terminal connected to the identification resistor. When a battery pack of this type is being charged, the charging device references the identification resistor through the connection terminal to identify the type of the battery pack.

CITATION LIST

Patent Literature

Japanese Patent Application Publication No. 2009-178012

SUMMARY OF THE INVENTION

Solution to Problem

However, battery packs are configured of a plurality of battery cells and include battery packs whose battery cells are connected in parallel, and battery packs whose battery cells are not connected in parallel (also called a 1-parallel configuration). The current flow per cell is greater in the 1-parallel configuration than all other parallel configurations. Consequently, if the battery pack is used continuously at high load, there is a chance that battery cells will become degraded or damaged by the generated heat and the like. In the case of power tools in particular, the battery pack may output 30 A or more of current, for example. Consequently, if the battery pack is made to output current at such a high load for a continuously long period, the likelihood of its battery cells becoming degraded or damaged increases.

Conventional power tools are unable to identify the type of battery pack connected thereto. Therefore, when the above type of 1-parallel battery pack is connected to a conventional power tool and made to expend power at high load, the battery pack may become degraded or damaged.

One conceivable solution would be to provide a special terminal on the power tool for referencing the identification resistor in the battery pack so that the power tool can identify the type of battery through this terminal. However, this configuration adds an extra terminal, which leads to increased costs. Further, this configuration is still not sufficient since the power tool cannot identify the type of a battery when the battery pack is not provided with an identification resistor. It is also conceivable to configure 1-parallel battery packs so that they cannot be mechanically connected to power tools in order to prevent degradation or damage to the battery cells in the battery pack that could occur during high-load output over long periods of time. However, since there is little possibility of the battery cells in a 1-parallel battery pack becoming degraded or damaged when operated at low load, or at high load for only a short period, preventing a 1-parallel battery pack from being used in such operations reduces operating efficiency.

In view of the foregoing, it is an object of the present invention to provide a power tool that can determine the type of secondary batteries without use of a special terminal. It is another object of the present invention to provide a power tool that restricts continuous use of a battery pack depending on the type of its secondary batteries.

In order to attain the above and other objects, the invention provides a power tool. The power tool includes a motor, a connecting unit, a voltage detection unit, and a controller. The connecting unit is configured to be connected to a secondary battery. The voltage detection unit is configured to detect a voltage of the secondary battery connected to the connecting unit. The controller is configured to acquire change of the detected voltage. The controller restricts the operation of the motor when the change of the voltage is a first value.

According to the above configuration, the power tool can restrict the operation of the motor based on types of the secondary battery.

Preferably, the controller restricts the operation of the motor to be more limited when the change of the voltage is the first value than when the change of the voltage is a second value smaller than the first value. According to the above configuration, the power tool can restrict the operation of the motor based on types of the secondary battery.

Preferably, the controller changes, based on the change of the voltage, a duration of time during which the motor rotates continuously. Accordingly, the power tool can restrict the operation of the motor based on the change of the voltage of the secondary battery.

Preferably, the connecting unit is configured to be selectively connected to one of a first type secondary battery and a second type secondary battery different from the first type secondary battery, output of the first type secondary battery being required to be restricted when used in a prescribed condition. The controller sets the duration of time such that the duration of time is shorter when the connecting unit is connected to the first type secondary battery than when the connecting unit is connected to the second type secondary battery.

Accordingly, the power tool can use the first type secondary battery that is required to be restricted when used in a prescribed condition. Further, the degradation of the secondary battery can be suppressed.

Preferably, the power tool further includes a current detection unit configured to detect current supplied from the secondary battery to the motor. The controller accumulates charge amount that is output from the secondary battery based on detection result by the current detection unit. The controller halts the motor when the accumulated charge amount is greater than or equal to a prescribed value. Accordingly, the degradation of the secondary battery can be suppressed.

According to another aspect, the present invention provides a power tool. The power tool includes a motor, a connecting unit, and a controller. The connecting unit is configured to be connected to a secondary battery. The controller is configured to restrict an operation of the motor based on an internal resistance of the secondary battery. The controller restricts the operation of the motor when the internal resistance is a first value.

According to the above configuration, the power tool can restrict the operation of the motor based on types of the secondary battery.

Preferably, the controller restricts the operation of the motor to be more limited when the internal resistance is the first value than when the internal resistance is a second value smaller than the first value. Accordingly, the power tool can restrict the operation of the motor based on the type of the secondary battery.

Preferably, the controller changes, based on the internal resistance, a duration of time during which the motor rotates continuously. Accordingly, the power tool can restrict the operation of the motor based on the internal resistance of the secondary battery.

Preferably, the connecting unit is configured to be selectively connected to one of a first type secondary battery and a second type secondary battery different from the first type secondary battery, output of the first type secondary battery being required to be restricted when used in a prescribed condition. The controller sets the duration of time such that the duration of time is shorter when the connecting unit is connected to the first type secondary battery than when the connecting unit is connected to the second type secondary battery.

Accordingly, the power tool can use the first type secondary battery that is required to be restricted when used in a prescribed condition. Further, the degradation of the secondary battery can be suppressed.

Preferably, the power tool further includes a current detection unit configured to detect current supplied from the secondary battery to the motor. The controller accumulates charge amount that is output from the secondary battery based on detection result by the current detection unit. The controller halts the motor when the accumulated charge amount is greater than or equal to a prescribed value. Accordingly, the degradation of the secondary battery can be suppressed.

According to another aspect, the present invention provides a power tool. The power tool includes a motor and a connecting unit. The connecting unit is configured to be selectively connected to one of a first type secondary battery and a second type secondary battery different from the first type secondary battery. A duration of time after which an operation of the motor is restricted is shorter when the connecting unit is connected to the first type secondary battery than when the connecting unit is connected to the second type secondary battery. Accordingly, the degradation of the secondary battery can be suppressed.

Preferably, a capacity of the first type secondary battery is smaller than a capacity of the second type secondary battery.

According to another aspect, the present invention provides a power tool. The power tool includes a motor, a connecting unit, and a voltage detection unit. The connecting unit is configured to be connected to a secondary battery. The voltage detection unit is configured to detect a voltage of the secondary battery connected to the connecting unit. The power tool further includes a determination unit configured to determine a type of the secondary battery based on change of the detected voltage. Accordingly, the power tool can distinguish the types of the secondary battery based on the change of the detected voltage.

Preferably, the determination unit determines whether the secondary battery is a first type secondary battery or a second type secondary battery different from the first type secondary battery based on a voltage drop of the secondary battery detected after the secondary battery is used. Output of the first type secondary battery is required to be restricted when used in a prescribed condition.

Preferably, the determination unit acquires a voltage drop from a first voltage of the secondary battery detected before the motor rotates to a second voltage detected after the motor rotates in a prescribed duration of time. The determination unit determines that the secondary battery is the first type secondary battery when the voltage drop is greater than or equal to a prescribed threshold value.

Accordingly, the power tool can distinguish the first type secondary battery that is required to halt its output when used in the prescribed condition based on the drop of the detected voltage.

Preferably, the power tool further includes a current detection unit configured to detect a current supplied from the secondary battery to the motor. The determination unit calculates an average current supplied from the secondary battery to the motor based on detection result by the current detection unit. The determination unit sets the prescribed threshold value based on the average current and the first voltage. Accordingly, the prescribed threshold value can be set based on the average current and the first voltage.

Preferably, the secondary battery includes a plurality of secondary battery cells. All of the plurality of secondary battery cells in the first type secondary battery are connected in series. Parallel connection existing in connecting the plurality of secondary battery cells in the second type secondary battery.

The power tool further includes a switch located between the connecting unit and the motor, and configured to selectively turn on and off the motor. Each time the switch turns on the motor, the determination unit acquires a prescribed voltage drop from a first voltage of the secondary battery detected before the motor rotates to a second voltage detected after the motor rotates in a prescribed duration of time and determines the prescribed voltage drop is greater than or equal to a prescribed threshold value. The determination unit determines whether the secondary battery is the first type secondary battery or the second type secondary battery based on number of time that the prescribed voltage drop is determined to be greater than or equal to the prescribed threshold value. Because the determination unit determines whether the prescribed voltage drop is greater than or equal to a prescribed threshold value in a plurality of times, the types of the secondary battery can be determined in high accuracy.

The power tool includes a current detection unit configured to detect current supplied from the secondary battery to the motor. The determination unit accumulates charge amount that is output from the secondary battery based on detection result by the current detection unit. The determination unit determines whether the secondary battery is the first type secondary battery or the second type secondary battery when the accumulated charge amount is greater than or equal to a prescribed value. Accordingly, the determination unit makes the determination at an appropriate timing.

Preferably, the determination unit subtracts a prescribed amount from the accumulated charge amount when the switch turns off the motor. Because the accumulated charge amount is subtracted from a prescribed amount when the switch turns off the motor, the timing of the determination made by the determining unit can be set considering a duration of time in which the motor is stopped.

Preferably, the determination unit controls the switch to turn off the motor when the secondary battery is determined to be the first type secondary battery. Accordingly, the degradation of the first type secondary battery can be suppressed.

Preferably, the determination unit controls the switch to turn off the motor when the secondary battery is determined to be the first type secondary battery. Accordingly, the degradation of the first type secondary battery can be suppressed.

Advantageous Effects of Invention

According to the power tool of the present invention, the type of the secondary battery can be determined without using dedicated terminal. Further, the power tool can restricts a duration of time during which the motor rotates continuously.

BRIEF DESCRIPTION OF DRAWINGS

FIG. 1 is a circuit diagram of a battery pack and a power tool according to a first embodiment of the present invention.

FIG. 2 is a graph showing a relation between each of initial voltages and each of threshold values for a specific average current according to the first embodiment.

FIG. 3 is graphs showing a plurality of threshold values corresponding to initial values for each of average current according to the first embodiment.

FIG. 4A is a flowchart illustrating a part of a battery type determination process according to the first embodiment.

FIG. 4B is a flowchart illustrating a remaining part of the battery type determination process.

FIG. 5 is a graph showing a relation between each of initial voltages and each of threshold values for a specific average current according to the second embodiment.

DESCRIPTION OF EMBODIMENTS

A cordless power tool according to an embodiment of the present invention will be described while referring to the accompanying drawings wherein like parts and components are designated by the same reference numerals to avoid duplicating description.

As shown in FIG. 1, a cordless power tool 20 (hereinafter simply called a "power tool 20") is connected to a rechargeable battery pack 1. The power tool 20 of the embodiment may be a circular saw or a planer, for example.

The battery pack 1 includes a plurality of secondary batteries 2, a protection IC 3, and a current detection circuit 7. The battery pack 1 is also provided with a plus terminal 4B, a minus terminal 5B, and an E terminal 6B. Power from the secondary batteries 2 is supplied to the power tool 20 through the plus terminal 4B and the minus terminal 5B. The E terminal 6B is connected to the protection IC 3.

The secondary batteries 2 include a plurality of battery cells. In the example of FIG. 1, the secondary batteries 2 includes four battery cells that are all connected in series. While the present invention is configured to target any given secondary battery rather than being limited to a particular type of battery cell, lithium-ion batteries will be used as the battery cells in this embodiment. Further, the configuration of four battery cells all connected in series will be called a 1-parallel configuration in the following description. That is, when four battery cells connected in series are treated as one cell unit, then two or three cell units connected in parallel are referred to as a 2-parallel configuration and 3-parallel configuration, respectively. Further, when two or more battery cells are connected in parallel and four of these parallel-connected battery cell units are connected in series, these configurations are similarly called a 2-parallel configuration and 3-parallel or greater configuration, respectively. The battery pack 1 having a 1-parallel configuration is referred to as a 1-parallel battery pack. Similarly, the battery pack 1 having a 2-parallel configuration, the battery pack 2 having a 3-parallel configuration are referred to as a 2-parallel battery pack, and 3-parallel battery pack, respectively. The example in FIG. 1 shows a 1-parallel battery pack, but the number of parallel connections may be greater than 1, such as a 2-parallel or 3-parallel configuration. The number of battery cells connected in series may be four or greater.

The current detection circuit 7 detects electric current outputted from the secondary batteries 2. More specifically, the current detection circuit 7 has a shunt resistor and outputs the voltage drop across the shunt resistor to the protection IC 3.

When the outputted current based on the detection results of the current detection circuit 7 is greater than or equal to a prescribed value, the protection IC 3 determines that the current is an overcurrent and outputs an abnormal signal to the E terminal 6B of the power tool 20. The protection IC 3 also detects the voltage of each battery cell and outputs an abnormal signal to the E terminal 6B when even one of the cells is in an overcharge or overdischarge state.

The power tool 20 includes a motor 8, a free-wheeling diode 9, a trigger switch 10, and an FET 17. The power tool 20 also includes a plus terminal 4A, a minus terminal 5A, and an E terminal 6A that are respectively connected to the plus terminal 4B, the minus terminal 5B, and the E terminal 6B of the battery pack 1. These terminals correspond to the connecting units of the present invention.

Power from the battery pack 1 is supplied to the motor 8 through the plus terminal 4A and the minus terminal 5A. The motor 8 is rotated by the power supplied from the battery pack 1. The trigger switch 10 is provided between the plus terminal 4A and the motor 8 for starting and stopping the motor 8. The FET 17 is provided between the motor 8 and the minus terminal 5A also for starting and stopping the motor 8. The free-wheeling diode 9 serves as a bypass to counter back EMF (electromotive force) produced by the motor 8 in order to prevent excess voltage being applied to the FET 17.

The power tool 20 further includes a microcontroller 11, a power holding circuit 12, a cutoff circuit 13, a three-terminal regulator 14, a trigger switch detection circuit 15, an FET drive circuit 16, a battery voltage detection circuit 18, a shunt resistor 19, a current detection circuit 21, and an error signal detection circuit 22.

The operator manipulates the trigger switch 10 to start and stop the motor 8. More specifically, the trigger switch 10 has three contacts a, b, and c. The contact a is connected to either the contact b or the contact c. The contact a is also connected to one end of the motor 8 and the power holding circuit 12, while the contact b is connected to the other end of the motor 8. The contact c is connected to the plus terminal 4A and the cutoff circuit 13. When the contact a is connected to the contact b (OFF state), the supply of power from the battery pack 1 to the motor 8 is interrupted. When the contact a is connected to the contact c (ON state), electricity is conducted from the battery pack 1 to the motor 8.

The three-terminal regulator 14 is connected to the plus terminal 4A through the cutoff circuit 13. The three-terminal regulator 14 supplies the regulated drive voltage to the microcontroller 11 by boosting or dropping the voltage applied by the battery pack 1.

The input side of the cutoff circuit 13 is connected to the output side of the power holding circuit 12. The input side of the power holding circuit 12 is connected to the contact a in the trigger switch 10 and a special port of the microcontroller 11. The power holding circuit 12 outputs a high signal or a low signal to the cutoff circuit 13. Specifically, when a voltage of at least a prescribed value (high signal) is inputted from at least one of the contact a and the special port of the microcontroller 11, the power holding circuit 12 outputs a high signal to the cutoff circuit 13. This high signal sets the cutoff circuit 13 in an ON state, allowing electricity to be conducted between the plus terminal 4A and three-terminal regulator 14.

When a voltage less than the prescribed value (low signal) is outputted from both the contact a and the special port of the microcontroller 11 (i.e., when a high signal is outputted from neither the contact a nor the special port of the microcontroller 11), the power holding circuit 12 outputs a low signal to the cutoff circuit 13. This low signal sets the cutoff circuit 13 to its OFF state, interrupting electrical conduction between the plus terminal 4A and the three-terminal regulator 14.

The battery voltage detection circuit 18 is provided between the cutoff circuit 13 and the microcontroller 11. The battery voltage detection circuit 18 includes a plurality of resistors that divide the battery voltage applied to the battery voltage detection circuit 18 from the plus terminal 4A via the cutoff circuit 13, and the divided voltage is outputted to the microcontroller 11. Hence, when the cutoff circuit 13 is in an ON state, the battery voltage detection circuit 18 divides the potential of the plus terminal 4A, i.e., the voltage of the battery pack 1 connected to the power tool 20 and outputs this divided voltage to the microcontroller 11. The microcontroller 11 detects the voltage value of the battery pack 1 based on the divided voltage value received from the battery voltage detection circuit 18.

The error signal detection circuit 22 is provided between the terminal 6A and the microcontroller 11. The error signal detection circuit 22 receives an abnormal signal from the protection IC 3 via the terminal 6A and outputs a corresponding signal to the microcontroller 11.

The current detection circuit 21 has an amplifier circuit. The current detection circuit 21 detects voltage drop due to the shunt resistor 19, amplifies the detection result through its amplifier circuit, and outputs the amplified signal to an AD port of the microcontroller 11. The microcontroller 11 detects the value of electric current flowing through the shunt resistor 19 based on the detection results from the current detection circuit 21.

When the contact a is connected to the contact c, the voltage of the secondary batteries 2 is applied to the trigger switch detection circuit 15. At this time, the trigger switch detection circuit 15 outputs a prescribed signal to a special port of the microcontroller 11 indicating that the battery voltage of the secondary batteries 2 (a voltage capable of driving the motor 8) has been detected. When the contact a is connected to the contact b, the voltage of the secondary batteries 2 is not applied to the trigger switch detection circuit 15. In this case, the trigger switch detection circuit 15 does not output the prescribed signal to the microcontroller 11.

The FET drive circuit 16 is connected between an output port of the microcontroller 11 and the FET 17. The FET drive circuit 16 switches the FET 17 on and off based on the signal outputted from the microcontroller 11.

The microcontroller 11 uses the FET drive circuit 16 to turn off the FET 17 when a signal indicating an abnormality has been received from the error signal detection circuit 22.

The microcontroller 11 also possesses memory for saving a threshold value used in a battery type determination process described later.

Next, activation of the microcontroller 11 will be described. In this description, it will be assumed that the power tool 20 is in an initial state when the contact a and the contact b in the trigger switch 10 are connected and when the microcontroller 11 has not been activated. This initial state occurs immediately after the battery pack 1 is connected to the power tool 20, for example.

When the operator manipulates the trigger switch 10 of the power tool 20 in this initial state to connect the contact a to the contact c, the voltage of the secondary batteries 2 is first applied to the input side of the power holding circuit 12. Consequently, the power holding circuit 12 outputs a high signal to the cutoff circuit 13. When this high signal is inputted from the power holding circuit 12, the cutoff circuit 13 switches to an ON state for conducting electricity between the plus terminal 4A and the three-terminal regulator 14. As a result, the voltage of the secondary batteries 2 is applied to the three-terminal regulator 14, whereby the three-terminal regulator 14 transforms the input voltage to produce a drive power and supplies the drive power to the microcontroller 11. Upon starting up, the microcontroller 11 immediately sets its output port linked to the power holding circuit 12 to a high state. In this state, the power holding circuit 12 continuously outputs a high signal to the cutoff circuit 13, even if the connection between the contact a and the contact c were to be disrupted (if the trigger switch 10 were to be turned off). Accordingly, the cutoff circuit 13 is also maintained in an ON state, ensuring that power from the three-terminal regulator 14 continues to be supplied to the microcontroller 11 so that the microcontroller 11 continues to operate.

Next, a battery type determination process according to the embodiment that is executed by the microcontroller 11 will be described. The microcontroller 11 determines whether the battery pack 1 mounted on the power tool 20 is of a type that requires its power to be restricted when used under a prescribed condition. Here, the prescribed condition is that the battery pack 1 is used continuously at high load, and specifically that the cumulative output capacity (or, charge amount output from the battery pack 1) is greater than or equal to least a prescribed value when the battery pack 1 outputs power continuously. Further, the microcontroller 11 of the embodiment determines the type of the battery pack to have either a 1-parallel configuration or a 2-parallel or greater configuration. When used continuously at high load, a 1-parallel battery pack is susceptible to degradation of its battery cells due to an increased amount of heat generated per cell and other reasons.

The microcontroller 11 accumulates the output capacity of the battery pack 1. When a 1-parallel battery pack 1 is connected to the power tool 20 and when the cumulative output capacity (hereinafter simply called "cumulative capacity") exceeds a prescribed value, the microcontroller 11 either turns off the FET 17 or decreases the duty cycle of the FET 17 in a case where a PWM control is performed, in order to halt or restrict output from the battery pack 1. As described above, heat and the like generated when the battery pack 1 is used continuously at high load can cause damage to the battery cells. Especially, a 1-parallel battery pack 1 is susceptible to degradation of its battery cells. However, the microcontroller 11 of the embodiment can prevent a 1-parallel battery pack 1 from being used continuously at high load by halting or restricting output from the battery pack 1 as described above.

FIG. 2 shows the threshold value for determining whether the battery pack 1 is a 1-parallel or a 2-parallel battery pack. As shown in FIG. 2, the threshold value is set based on the initial voltage. The threshold value is compared with the magnitude of voltage drop. The initial voltage in this case is the voltage value of the battery pack 1 when the motor 8 is halted. The magnitude of voltage drop is the difference between this initial voltage and the voltage of the battery pack 1 after the motor 8 has been driven over a prescribed period. Note that FIG. 2 indicates the threshold value when the average current outputted from the battery pack 1 is 30 A. In this example, the threshold value is approximately 3.3 V when the initial voltage was 11.5 V, approximately 2.1 V when the initial voltage was 14 V, and approximately 3.0 V when the initial voltage was 16.5 V.

Unfilled circles in FIG. 2 plot the relationship between the initial voltage and the magnitude of voltage drop when a 1-parallel battery pack 1 is actually used, while filled circles plot the relationship between the initial voltage and the magnitude of voltage drop when a 2-parallel battery pack 1 is actually used. A point between the voltage drop for a 1-parallel battery and the voltage drop for a 2-parallel battery is set as the threshold value for each initial voltage. As is clear from the plotted filled circles and unfilled circles, the magnitude of voltage drop is larger for 1-parallel battery packs than for 2-parallel battery packs, regardless of the initial voltage. The magnitude of voltage drop reaches a minimum value when the initial voltage is near 14 V for each of a 1-parallel battery pack and a 2-parallel battery pack. The voltage drop exhibits characteristics of increasing value as the initial value moves away from the value at which the magnitude of voltage drop is at its minimum value in the embodiment (hereinafter called "V characteristics"). Thus, the threshold value is also set to have V characteristics. The microcontroller 11 approximates this threshold value as a quadratic function of the initial voltage and saves the function. Note that the voltage drop of the battery pack 1 is not limited to having V characteristics.

The magnitude of voltage drop is dependent on internal resistance values of the battery pack 1. Since the internal resistance is higher in a battery pack having a 1-parallel configuration than a battery pack having a 2-parallel configuration, the magnitude of voltage drop will be greater in the 1-parallel battery pack, even if the same current flows through both. The output of the battery pack 1 (duration of continuous use by the power tool 20 or dead time until output of the motor is restricted) can be restricted based on voltage drop caused by this internal resistance.

When the measured voltage drop for the battery pack 1 is greater than or equal to the threshold value, the microcontroller 11 tentatively determines that a 1-parallel battery pack 1 is connected to the power tool 20. When the voltage drop is less than the threshold value, the microcontroller 11 tentatively determines that a 2-parallel battery pack 1 is connected. This determination is repeated a plurality of times until the microcontroller 11 ultimately decides that the battery pack 1 is either a 1-parallel or 2-parallel battery pack (described later in greater detail).

As shown in FIG. 3, a threshold value (quadratic function of the initial voltage) is set for each value of average current outputted by the battery pack 1. In the embodiment, threshold values are set for average current values at intervals of 0.5 A. The threshold value rises as the average current increases, for the same initial voltage.

The microcontroller 11 saves a threshold value for each average current as a quadratic function of the initial voltage. Note that the intervals of average current are set to 0.5 A in this example, but threshold values may be set at different intervals. Further, while the threshold values indicated in FIG. 3 are set for an average current within the range of 20-40 A, threshold values may exist for average currents outside this range. However, as will be described below, determinations are not made using threshold values when the average current outputted from the battery pack 1 is less than 20 A. Accordingly, threshold values are not necessary for average currents less than 20 A in the embodiment. However, it may be necessary to prepare threshold values for average currents less than 20 A when determinations are made using threshold values even for such low average currents. Note that these threshold values may be found in advance through experimentation and saved in the memory of the microcontroller 11.

Next, the battery type determination process will be described in detail while referring to the flowcharts in FIGS. 4A and 4B. This process begins when the battery pack 1 is mounted on the power tool 20, but while the microcontroller 11 is not activated and the trigger switch 10 is in its OFF state. When the operator switches on the trigger switch 10, in step 201 the voltage of the battery pack 1 (high signal) is applied to the power holding circuit 12, whereby the power holding circuit 12 begins outputting a high signal to the cutoff circuit 13. When the high signal is inputted from the power holding circuit 12, the cutoff circuit 13 changes to an ON state, whereby the three-terminal regulator 14 begins supplying drive power to the microcontroller 11, starting up the microcontroller 11. Directly after start-up, the microcontroller 11 basically continuously outputs a high signal to the power holding circuit 12. Accordingly, the power holding circuit 12 can continue to transmit a high signal to the cutoff circuit 13, even if the trigger switch 10 is turned off, and the three-terminal regulator 14 can continue to supply power to the microcontroller 11.

In step 202 the microcontroller 11 measures the voltage of the battery pack 1 in its no-load state based on output results from the battery voltage detection circuit 18 and stores the measured value as an initial voltage V0. From start-up to this step, the microcontroller 11 maintains the FET 17 in its OFF state. In step 203 the microcontroller 11 uses the FET drive circuit 16 to switch the FET 17 to an ON state for driving the motor 8. Here, if the error signal detection circuit 22 receives the abnormal signal, the microcontroller 11 may maintain the FET 17 in its OFF state and wait until the abnormal signal is eliminated. In step 204, the microcontroller 11 determines whether the trigger has been moved to the ON position based on the trigger switch detection circuit 15. If the microcontroller 11 determines in step 204 that the trigger switch 10 is on (step 204: YES), in step 206 the microcontroller 11 identifies the value of current supplied from the battery pack 1 based on detection results from the current detection circuit 21, and in step 207 begins accumulating the output capacity of the battery pack 1. The output capacity is the product of the current value and a unit of time (0.1 seconds, for example). Thereafter, the microcontroller 11 finds the output capacity at each unit time and totals the results.

In step 208 the microcontroller 11 determines whether a prescribed time has elapsed since driving of the motor 8 was initiated. While determining that the prescribed time has not elapsed (step 208: NO), in step 209 the microcontroller 11 determines whether the trigger switch 10 is being maintained in its ON state based on detection results from the trigger switch detection circuit 15. When the microcontroller 11 determines that the trigger switch 10 is off (step 209: NO), the microcontroller 11 returns to step 202.

However, when the trigger switch 10 remains in an ON state (step 209: YES), in step 210 the microcontroller 11 determines based on a detection result of the error signal detection circuit 22 whether the battery pack 1 has outputted an abnormal signal. If an abnormal signal has not been outputted (step 210: NO), the microcontroller 11 returns to step 208.

However, when an abnormal signal was outputted (step 210: YES), in step 211 the microcontroller 11 controls the FET drive circuit 16 to switch off the FET 17, halting rotation of the motor 8. Next, in step 212 the microcontroller 11 maintains the low-signal output to the power holding circuit 12. Since the trigger switch 10 is not off in this state, power is still supplied to the microcontroller 11. However, since the microcontroller 11 no longer outputs a high signal to the power holding circuit 12, the power supply to the microcontroller 11 will be halted if the trigger switch 10 is turned off, discontinuing operations of the microcontroller 11. This operation resets the microcontroller 11.

Thus, the microcontroller 11 begins the process of FIG. 4A from step 201 when the trigger switch 10 is once again switched on. If the battery pack 1 no longer outputs an abnormal signal at this time, the motor 8 can be driven. For example, if the abnormal signal from the battery pack 1 was due to overcurrent, this overcurrent state can be eliminated by temporarily turning off the motor 8. Accordingly, the power tool 20 can be used normally after the trigger switch 10 is switched back on.

On the other hand, if the microcontroller 11 determines in step 208 that the prescribed time has elapsed (step 208: YES), then in step 213 the microcontroller 11 measures the current voltage value of the battery pack 1 based on the output results from the battery voltage detection circuit 18 and finds the magnitude of voltage drop DV by calculating the difference between the current voltage value and the initial voltage measured in step 202.

In step 214 the microcontroller 11 measures the average current over a prescribed period from the starting point of driving the motor 8 (the period until a YES determination was made in step 208). The microcontroller 11 finds the average current by dividing the cumulative capacity by the prescribed time period, for example.

In step 215 of FIG. 4B the microcontroller 11 determines whether the average current is greater than or equal to a prescribed value (20 A in the embodiment). If the average current is greater than or equal to the prescribed value in step 215 (step 215: YES), in step 216 the microcontroller 11 tentatively determines the type of battery based on the initial voltage, the average current, and the voltage drop.

Specifically, the microcontroller 11 first reads a threshold value (value determined from quadratic function) corresponding to the average current found in step 214 from the threshold value stored for each average current as quadratic functions of initial voltage, as illustrated in FIG. 3. The microcontroller 11 sets the threshold value to the value obtained by plugging the initial voltage measured in step 202 into the quadratic function read in step 215.

In step 217 the microcontroller 11 compares this threshold value to the magnitude of voltage drop and tentatively determines whether the battery pack 1 has a 1-parallel configuration. More specifically, if the voltage drop is greater than or equal to the threshold value, the microcontroller 11 tentatively determines that a 1-parallel battery pack 1 is connected to the power tool 20 (step 5217: YES). In this case, the microcontroller 11 increments a counter N1 in step 218.

If the voltage drop is less than the threshold value, the microcontroller 11 tentatively determines that the connected battery pack 1 has a 2-parallel or greater configuration (step 5217: NO). In this case, the microcontroller 11 increments a counter N2 in step 219

After completing step 218 or step 219, in step 220 the microcontroller 11 determines whether the current cumulative capacity is greater than or equal to a prescribed value. This prescribed value is predetermined to ensure that the cumulative capacity falls within a range within which the life of a 1-parallel battery pack 1 used by the power tool 20 will not be degraded (reduced).

If the cumulative capacity is greater than or equal to the prescribed value, in step 221 the microcontroller 11 determines whether the counter N1 is greater than or equal to the sum of the counter N2 and a prescribed value a. If the counter N1 is greater than or equal to the counter N2 plus the prescribed value a, the microcontroller 11 ultimately decides that a 1-parallel battery pack 1 is connected to the power tool 20.

Thus, the determination of step 221 functions to determine whether the number of times N1 that the battery pack 1 was tentatively determined to have a 1-parallel configuration in steps 217 and 218 is greater than or equal to the sum of the prescribed value a and the number of times N2 in which the battery pack 1 was determined in step 219 not to be a 1-parallel battery pack. In this example, a is a positive constant and is set to 5 in the embodiment.

Hence, the microcontroller 11 in the embodiment ultimately determines that a 1-parallel battery pack 1 is connected to the power tool 20 when the number of times N1 in which the battery pack 1 was tentatively determined to have a 1-parallel configuration is sufficiently larger than the number of times N2 in which the battery pack 1 was determined not to have a 1-parallel configuration. By determining that a 1-parallel battery pack 1 is connected to the power tool 20 when N1 is sufficiently larger than N2 by performing the determination in step 217 a plurality of times, it is possible to suppress determination error in order to reliably determine the type of the battery pack 1 (whether the battery pack 1 is a 1-parallel battery pack).

When the microcontroller 11 determines in step 221 that the counter N1 is greater than or equal to the counter N2 plus the prescribed value a (step 221: YES), in step 222 the microcontroller 11 uses the FET drive circuit 16 to turn off the FET 17, halting the drive of the motor 8. Consequently, output of the battery pack 1 is also halted, preventing a battery pack 1 with a 1-parallel configuration from driving the power tool 20 for more than a prescribed time (or, preventing a battery pack 1 with a 1-parallel configuration from continuously outputting such that the cumulative capacity does not go beyond the prescribed value).

In step 223 the microcontroller 11 waits for a prescribed period to elapse after the FET 17 was switched off. The microcontroller 11 maintains the FET 17 in its off state during repeatedly performing step 223. While waiting for this prescribed time to elapse in step 223, the microcontroller 11 continuously outputs a high signal to the power holding circuit 12, not stopping even if the operator temporarily switches the trigger switch 10 off and then back on again. Accordingly, the power holding circuit 12 continues to output a high signal to the cutoff circuit 13, maintaining the cutoff circuit 13 in an ON state. Hence, the microcontroller 11 continues driving without being reset, thereby maintaining the FET 17 in its OFF state.

As described above, the microcontroller 11 switches the FET 17 off in step 222 to prevent a 1-parallel battery pack 1 from outputting power for a long period. If the microcontroller 11 were reset by the operator temporarily switching the trigger switch 10 off and then back on again, allowing the battery pack 1 to resume output, the battery pack 1 would essentially be able to output power for a period exceeding the prescribed time period by resuming output after only a short shutdown period. However, since the microcontroller 11 is allowed to continue operating in step 223 of the embodiment, the battery pack 1 can be prevented from outputting power for a long duration.

In step 224 the microcontroller 11 stops outputting a high signal to the power holding circuit 12. If the operator subsequently switches off the trigger switch 10, halting the supply of power to the microcontroller 11, then the microcontroller 11 stops operating. In this way, the microcontroller 11 is reset and executes the process described above from step 201 when the trigger switch 10 is again switched on. By waiting a prescribed period in step 223, the microcontroller 11 halts output from the battery pack 1 for a prescribed period, thereby preventing the battery pack 1 from being used continuously at high load and ensuring that the battery pack 1 has returned to a problem-free state when the battery pack 1 can again output power. Accordingly, if the process begins again from step 201, the battery pack 1 can be used to drive the motor 8.

If the microcontroller 11 determines in step 215 that the average current is less than the prescribed value (20 A) (step 215: NO), then even a 1-parallel battery pack 1 could provide continuous output for a long duration without problem since the average current being outputted is sufficiently small. Thus, it is not necessary to halt output from the battery pack 1 in this case, and the microcontroller 11 skips the determination in step 217 and advances directly to step 220. Alternatively, the microcontroller 11 may also skip the determination in step 220 and advance directly to step 221 in this case.

If the microcontroller 11 determines in step 220 that the cumulative capacity is less than the prescribed value or if the microcontroller 11 determines in step 221 that the counter N1 is less than the sum of the counter N2 and the prescribed value a, then in step 225 the microcontroller 11 determines whether the trigger switch 10 is on. The microcontroller 11 returns to step 202 when the trigger switch 10 is off (step 225: NO). Hence, the microcontroller 11 repeats the determination in step 217 if the trigger switch 10 is subsequently switched back on. When the trigger switch 10 remains in an ON state in step 225 (step 225: YES), in step 226 the microcontroller 11 determines based on a detection result of the error signal detection circuit 22 whether an abnormal signal has been outputted from the battery pack 1. The microcontroller 11 returns to step 220 if an abnormal signal has not been outputted (step 226: NO) and returns to step 211 if an abnormal signal has been outputted (step 226: YES).

In step 205 the microcontroller 11 subtracts a prescribed quantity from the cumulative capacity when determining in step 204 that the trigger switch 10 is off (step 204: NO). Here, the prescribed quantity of subtraction may be set based on the amount of time that the trigger switch 10 was off. For example, the prescribed quantity of subtraction may be proportional to the amount of time that the trigger switch 10 was off. Since output from the battery pack 1 is halted when the trigger switch 10 is off, continuous use of the battery pack 1 is avoided and, hence, the prescribed quantity is subtracted from the cumulative capacity in accordance with the stoppage time. As is clear from the flowcharts in FIGS. 4A and 4B, the process of step 205 is executed when the microcontroller 11 determines in step 225 or step 209 that the trigger switch 10 is off.

In the process described above, the prescribed value a used in step 221 is set to 5, but the prescribed value a may be set to a value other than 5, or even 0, or, a may be negative constant. When a is 0, a positive determination may result in step 221, even after obtaining only one determination result in step 217. That is, tentatively determining that the 1-battery pack 1 is connected to the power tool 20 in step 217 only once indicates the ultimate decision that the 1-battery pack 1 is connected to the power tool 20. Hence, output from the battery pack 1 may be halted when there is even a small possibility that a 1-parallel battery pack 1 is connected to the power tool 20, for example.

According to the configuration described above, the microcontroller 11 determine the type of battery pack based on the change of the voltage (voltage drop) of the battery pack 1. That is, when the change of the voltage of the battery pack 1 is greater than or equal to a threshold value, the microcontroller 11 determines that the battery pack 1 is a 1-parallel battery pack. When the change of the voltage of the battery pack 1 is less than the threshold value, the microcontroller 11 determines that the battery pack 1 is a 2-parallel or greater battery pack. If the microcontroller determines that the 1-parallel battery pack is connected to the power tool 20, the microcontroller 11 halts the operation of the motor 8. That is, the microcontroller 11 restricts the operation of the motor to be more limited (or restricts the operation of the motor more rigidly) when the change of the voltage of the battery pack is greater than or equal to the threshold value than when the change of the voltage of the battery is less than the threshold value.

The power tool 20 having the structure described above can determine the type of battery (internal resistance of the battery pack), i.e., whether the battery pack 1 has a 1-parallel configuration or a 2-parallel or greater configuration based on the initial voltage prior to operating the motor 8 (no-load voltage) and the magnitude of voltage drop and the average current after the motor 8 has been operated. Since this construction does not require a special terminal for identifying the battery type, the structure can suppress a cost increase resulting from the special terminal.

Further, the threshold value for determining the battery type varies according to the initial voltage and the average current. Hence, the power tool 20 can use a suitable threshold value for the state of the battery pack 1 and the manner in which power is outputted by the battery pack 1.

Further, the microcontroller 11 tentatively determines whether the battery pack 1 has a 1-parallel configuration each time the trigger switch 10 is switched from off to on, i.e., each time the motor 8 is halted and restarted. The microcontroller 11 ultimately decides the type of battery cells in the battery pack 1 based on the results of a plurality of tentative determinations. In this way, the microcontroller 11 can minimize incorrect determinations when identifying the type of battery pack 1.

As described above, the magnitude of voltage drop (change of the voltage) is dependent on internal resistance values of the battery pack 1. That is, the larger the magnitude of voltage drop is the larger the internal resistance of the battery pack 1. Thus, from the determination in step 217 essentially determines the magnitude of the internal resistance values of the battery pack. Thus, since the power tool 20 can restrict output from the battery pack 1 (the allowable time that the power tool 20 can be continuously used) based on the internal resistance of the battery pack 1, the power tool 20 can minimize degradation of the battery pack 1 due to overload operations, regardless of whether the battery pack 1 has a 1-parallel configuration or a 2-parallel configuration. In other words, the microcontroller 11 may restrict the operation of the motor to be more limited (or restricts the operation of the motor more rigidly) when the resistance of the battery pack is greater than or equal to a threshold than when the resistance of the battery is less than the threshold. Note that since the internal resistance changes according to the extent of degradation of its battery cells, even among batteries of the same parallel number, the power tool 20 can further suppress degradation of the battery pack 1 due to overload operations.

Further, the power tool 20 calculates the cumulative output capacity of the battery pack 1 and restricts output from the battery pack 1 when the cumulative capacity is greater than or equal to a prescribed value and upon confirming that the battery pack 1 has a 1-parallel configuration. Hence, the power tool 20 can use the battery pack 1 continuously as long as possible and can halt its output as a suitable timing that will not damage the battery pack 1.

Note that output from the power tool 20 may be restricted without halting output from the battery pack 1 (without prohibiting use of the power tool 20), even when the battery pack 1 is in a continual overload state. Specifically, when the battery pack 1 connected to the power tool 20 has a 1-parallel configuration, in step 222 of FIG. 4B the microcontroller 11 may reduce the PWM duty cycle from a state in which the FET 17 is constantly in an ON state (the PWM duty cycle of 100%). In this case, the microcontroller 11 can continue operations for rotating the battery pack 1 albeit at a reduced speed. Further, reducing the speed of the battery voltage detection circuit 18 notifies the operator of this overload state.

Next, a second embodiment of the present invention will be described. In the first embodiment, the power tool 20 identifies whether the battery pack 1 connected to the power tool 20 has a 1-parallel configuration or a 2-parallel or greater configuration. In the second embodiment, the power tool 20 distinguishes among a battery pack 1 with a 1-parallel configuration, a battery pack 1 with a 2-parallel configuration, and a battery pack 1 with a 3-parallel or greater configuration.

FIG. 5 shows threshold values used for an average current of 30 A. More specifically, FIG. 5 depicts the relationship between the initial voltage and a first threshold value and the relationship between the initial voltage and a second threshold value. The first threshold value is used for determining whether the battery pack 1 has a 1-parallel or a 2-parallel configuration and is the same threshold value used in the first embodiment. In other words, the first threshold value in FIG. 5 is identical to the threshold value in FIG. 2. The second threshold value is used for determining whether the battery pack 1 has a 2-parallel or 3-parallel or greater configuration and is set lower than the first threshold value, assuming the same initial voltage. As with the first threshold value, the second threshold value has V characteristics. Further, the second threshold value is also provided as a quadratic function of initial voltage. As in the first embodiment, a plurality of first and second threshold values are prepared for prescribed intervals of average current and saved in the microcontroller 11.

The microcontroller 11 in the second embodiment tentatively determines whether the battery pack 1 has a 1-parallel configuration, a 2-parallel configuration, or a 3-parallel or greater configuration using the first and second threshold values. More specifically, the microcontroller 11 tentatively determines that the battery pack 1 has a 1-parallel configuration if the magnitude of voltage drop is greater than or equal to the first threshold value, tentatively determines that the battery pack 1 has a 2-parallel configuration if the voltage drop is greater than or equal to the second threshold value and less than the first threshold value, and tentatively determines that the battery pack 1 has a 3-parallel or greater configuration if the voltage drop is less than the second threshold value.

The microcontroller 11 increments counters N1, N2, and N3 each time the battery pack 1 is tentatively determined to have a 1-parallel configuration, a 2-parallel configuration, and a 3-parallel or greater configuration, respectively. The microcontroller 11 confirms (ultimately decides) that the battery pack 1 has a 1-parallel configuration when N1 is greater than or equal to the sum of N1, N2, and the prescribed value a. Further, the microcontroller 11 confirms that the battery pack 1 has a 2-parallel configuration if N2 is greater than the sum of N3, N1, and the prescribed value a. Similarly, the microcontroller 11 confirms that the battery pack 1 has a 3-parallel or greater configuration if N3 is greater than or equal to the sum of N1, N2, and the prescribed value a. The microcontroller 11 does not confirm the number of parallel connections in the battery pack 1 in all other cases. Confirmation of the battery pack 1 from among the 1-parallel, 2-parallel, and 3-parallel or greater configurations described above is just an example and not limited thereto. The confirmation of the battery pack 1 may be performed differently based at least on the N1, N2, and N3.

The microcontroller 11 turns off the FET 17 upon confirming that the battery pack 1 has a 1-parallel configuration and that the cumulative capacity is greater than or equal to a first prescribed value. The microcontroller 11 reduces output through PWM control of the FET 17 (by reducing the PWM duty cycle) upon confirming that the battery pack 1 has a 2-parallel configuration and that the cumulative capacity is greater than or equal to the first prescribed value. The microcontroller 11 maintains the FET 17 in its ON state upon confirming that the microcontroller 11 has a 3-parallel or greater configuration. Alternatively, the microcontroller 11 may turn off the FET 17 upon confirming that the battery pack 1 has a 1-parallel configuration and that the cumulative capacity is greater than or equal to the first prescribed value and may turn off the FET 17 upon confirming that the battery pack 1 has a 2-parallel configuration and that the cumulative capacity is greater than or equal to a second prescribed value, which is greater than the first prescribed value. In any cases, the microcontroller 11 restricts the operation of the motor to be more limited (or restricts the operation of the motor more rigidly) when the change of the voltage of the battery pack (voltage drop) is greater than or equal to the threshold value than when the change of the voltage of the battery is less than the threshold value.

Through the process described above, the power tool 20 can distinguish among battery packs having three types of connection configurations. Further, the power tool 20 can halt or restrict output from a 1-parallel battery pack 1 or a 2-parallel battery pack 1 based on the cumulative capacity.

While the invention has been described in detail with reference to the embodiments thereof, it would be apparent to those skilled in the art that various changes and modifications may be made therein without departing from the scope of the invention.

The microcontroller 11 saves a threshold value for each average current as a quadratic function of initial voltage. However, threshold values may be approximated using a function other than a quadratic function. Alternatively, a threshold value may be saved in place of a quadratic function for each of a plurality of initial voltages and, when a threshold value is not saved for a given initial voltage, the threshold value may be found through linear interpolation. Note that these threshold values may also be prepared and saved for each of a plurality of average currents. Further, a matrix correlating no-load voltages with voltage drop for each current may be saved in the microcontroller 11 (in memory), and the microcontroller 11 may determine the type of battery pack 1 based on where the detected values fall in this matrix.

In the first embodiment described above, the power tool 20 identifies two types of battery packs 1, including battery packs 1 having a 1-parallel configuration and battery packs 1 having a larger number of parallel connections. In the second embodiment, the power tool 20 identifies three types of battery packs 1, including battery packs 1 having a 1-parallel configuration, a 2-parallel configuration, and a 3-parallel or greater configuration. However, the power tool 20 may be configured to identify four or more types of battery packs 1 according to need.

Further, the power tool 20 is not limited to restricting motor output based on the number of parallel connections for the secondary batteries, but may also be configured to restrict motor output according to the capacity of the battery pack, i.e., to restrict motor output when the capacity is low.

Further, when the battery pack 1 has a built-in microcontroller, this microcontroller may be provided with the same function as the microcontroller 11 in the power tool 20. With this configuration, the battery pack 1 may be responsible for determining whether the power tool 20 connected to the battery pack 1 can be used continuously and for restricting its own output. In this case, an FET and an FET drive circuit similar to the FET 17 and the FET drive circuit 16 respectively may be provided in the battery pack 1. This FET is provided between the secondary batteries 2 and the terminal 4B, or between the secondary batteries 2 and the terminal 5B, and the microcontroller in the battery pack 1 switches off the FET in the battery pack 1 via the FET drive circuit in the battery pack 1 in order to halt or restrict output from the secondary batteries 2.

In the embodiments described above, initial voltage is the voltage value when the motor 8 is at rest, and the magnitude of voltage drop is acquired when a prescribed time has elapsed from the initial voltage. However, the magnitude of voltage drop may be set to the difference between a first voltage value and a second voltage value. Here, the first voltage value is a voltage value detected when a first prescribed time has elapsed after the motor 8 was started, and the second voltage value is the voltage value detected a second prescribed time after the motor 8 was started. In this case, threshold values having different values from those shown in FIGS. 2 and 3 are saved in the microcontroller 11, where the first voltage value is used in place of the initial voltage and voltage drop is the difference between the first voltage value and the second voltage value. This voltage drop is compared with the threshold.

REFERENCE SIGN LIST

1 battery pack
20 cordless power tool
8 motor
10 trigger switch
11 microcontroller
12 power holding circuit
15 trigger switch detection circuit
16 FET drive circuit
18 battery voltage detection circuit

The invention claimed is:

1. A power tool comprising:
a motor;
a controller; and
a connecting unit configured to be selectively connected to one of a first type secondary battery and a second type secondary battery different from the first type secondary battery, the first type secondary battery having only one cell unit in which battery cells are connected in series, and the second type secondary battery having two cell units connected in parallel or two cells connected in parallel,
wherein the motor is driven by power supplied from a connected secondary battery which is one of the first type secondary battery and the second type secondary battery connected to the connecting unit,
wherein while the motor is driven by power supplied from the connected secondary battery, the controller is configured to perform a restriction operation in which driving of the motor is stop or restricted on a basis of a state of the connected secondary battery,
wherein when the first type secondary battery is connected to the connecting unit, the restriction operation is performed so that the driving of the motor is more limited than when the second type secondary battery is connected to the connecting unit.

2. The power tool according to claim 1, wherein when a load of the motor is less than a prescribed value, the controller is configured to maintain the driving of the motor irrespective of the connected secondary battery.

3. The power tool according to claim 1, wherein a capacity of the first type secondary battery is smaller than a capacity of the second type secondary battery.

4. The power tool according to claim 1, wherein the controller is configured to set a duration of time during which the motor rotates continuously,
wherein the duration of time is shorter when the connecting unit is connected to the first type secondary battery than when the connecting unit is connected to the second type secondary battery.

5. A power tool comprising:
a motor;
a controller, and
a connecting unit configured to be selectively connected to one of a first type secondary battery and a second type secondary battery different from the first type secondary battery, the first type secondary battery having only one cell unit in which battery cells are connected in series, and the second type secondary battery having two cell units connected in parallel or two cells connected in parallel,
wherein the controller is configured to drive the motor by power supplied from the first type secondary battery or the second type secondary battery connected to the connecting unit,
wherein the controller is configured to restrict an operation of the motor to be more limited when the connecting unit is connected to the first type secondary battery than when the connecting unit is connected to the second type secondary battery.

6. The power tool according to claim 5, wherein when a load of the motor is less than a prescribed value, the controller is configured to maintain the driving of the motor irrespective of the first type secondary battery or the second type secondary batter connected to the connecting unit.

7. The power tool according to claim 5, wherein a capacity of the first type secondary battery is smaller than a capacity of the second type secondary battery.

8. The power tool according to claim 5, wherein the controller is configured to set a duration of time during which the motor rotates continuously,
wherein the duration of time is shorter when the connecting unit is connected to the first type secondary battery than when the connecting unit is connected to the second type secondary battery.

9. A power tool comprising:
a motor;
a controller; and
a connecting unit configured to be selectively connected to one of a first type secondary battery having a first capacity and a second type secondary battery different from the first type secondary battery and having a second capacity, the first capacity is lower than the second capacity,
wherein the motor is driven by power supplied from a connected secondary battery which is one of the first type secondary battery and the second type secondary battery connected to the connecting unit,
wherein while the motor is driven by power supplied from the connected secondary battery, the controller is configured to perform a restriction operation in which driving of the motor is stop or restricted on a basis of a state of the connected secondary battery,
wherein when the first type secondary battery is connected to the connecting unit, the restriction operation is performed so that the driving of the motor is more limited than when the second type secondary battery is connected to the connecting unit.

* * * * *